United States Patent [19]

Satake

[11] Patent Number: 4,829,891

[45] Date of Patent: May 16, 1989

[54] RICE GRAIN HUMIDIFYING APPARATUS

[75] Inventor: Toshihiko Satake, Higashihiroshima, Japan

[73] Assignee: Satake Engineering Co., Ltd., Tokyo, Japan

[21] Appl. No.: 20,116

[22] Filed: Feb. 27, 1987

[30] Foreign Application Priority Data

Mar. 4, 1986 [JP] Japan .................................. 61-47693

[51] Int. Cl.⁴ ........................... A23L 1/00; A23L 3/00
[52] U.S. Cl. ........................................ 99/471; 99/483; 99/487; 99/516
[58] Field of Search ................ 99/467, 470, 471, 472, 99/473–476, 483, 485, 487, 516, 518, 525, 534–536, 600, 609–611, 612, 617–622; 426/506, 507, 511, 627

[56] References Cited

U.S. PATENT DOCUMENTS

| | | | |
|---|---|---|---|
| 4,059,046 | 11/1977 | Yamazaki et al. | 99/470 X |
| 4,096,792 | 6/1978 | Smith, Jr. | 99/471 X |
| 4,255,459 | 3/1981 | Glen | 99/470 X |
| 4,421,020 | 12/1983 | Gross | 99/472 |
| 4,508,029 | 4/1985 | Malone | 99/516 |
| 4,543,879 | 10/1985 | Catelli | 99/472 |
| 4,660,468 | 4/1987 | Goldhahn | 99/516 X |

Primary Examiner—Timothy F. Simone
Attorney, Agent, or Firm—Henry Sternberg; Bert J. Lewen

[57] ABSTRACT

In an apparatus for humidifying rice grains, a humidifying vessel has defined therewithin a substantially closed space and has a rice supply port and a rice discharge port. Rice grains are supplied into the humidifying vessel through the supply port, while gas is substantially prevented from escaping from the space within the humidifying vessel through the supply port. Rice grains are discharged from the humidifying vessel through the discharge port, while the gas is substantially prevented from escaping from the space within the humidifying vessel through the discharge port. Gas is forcibly delivered into the humidifying vessel to pressurize the space therewithin. Moisture is added to the rice grains within the pressurized space within the humidifying vessel. The moisture is added to the rice grains within the substantially closed space and, simultaneously, the moisture added to each rice grain is penetrated into an interior of the rice grain under pressure.

19 Claims, 4 Drawing Sheets

4,829,891

RICE GRAIN HUMIDIFYING APPARATUS

BACKGROUND OF THE INVENTION

The present invention relates to apparatuses for humidifying rice grains such as brown rice grains and polished rice grains and, more particularly, to an apparatus for humidifying rice grains up to a predetermined moisture content, without causing cracks to occur therein, to improve taste of boiled and cooked rice.

In general, one of important factors influencing the taste of boiled and cooked rice is a moisture content of polished rice before it is dipped in water for the purpose of being boiled and cooked. If the polished rice having the moisture content of approximately 15% is dipped in water within a cooker, no cracks occur in the surface of the polished rice. Accordingly, the polished rice having the moisture content of approximately 15% can be boiled and cooked in a whole grain configuration. The boiled and cooked rice having such whole grain configuration retains adequate glutinosity and hardness which are factors of taste, and is superior in taste. However, the polished rice having a mixture content less than 14% absorbs moisture at a considerably high rate when the rice is dipped in water. The quick absorption of moisture causes cracks to instantaneously occur in the rice grain surfaces and, soon after, the cracks are developed into the interiors of the rice grains to form splits or fractures. Water penetrates into the splits. When the polished rice is boiled and cooked under such condition, gelatinized starch flows out of the splits and adheres to the rice grain surfaces. This renders the rice grains sticky. Moreover, since the boiled and cooked rice grains are broken due to the splits, the rices grains are deteriorated in quality, and have no sufficient biting-resistance and glutinosity. Thus, in order to improve the taste, it is necessary to apply the humidifying treatment to the polished rice grains so as to have the moisture content of approximately 15%, before the polished rice grains are dipped in water for the purpose of being boiled and cooked. It is necessary to bring the moisture content of the polished rice to the level of about 15% in order also to prevent the rice from getting mold and from being decomposed. In the humidifying treatment, however, it is essential to avoid occurrence of cracks in the rice grain surfaces. The maximum limit of the rate at which the polished rice can absorb moisture under a natural condition, i.e., the maximum moisture adding rate at which the rice grains are humidified without causing cracks to occur therein is 0.3% per one hour. When moisture is added to the polished rice at a rate higher than 0.3% per one hour, the moisture exceeding the natural moisture absorbing rate of the rice grains remains on the rice grain surfaces, to thereby wet the same. If the rice grain surfaces are wetted, the surface layer of each rice grain abruptly absorbs the moisture and is expanded, to cause strain to be developed between the surface layer and the interior of the rice grain. The strain results in the occurrence of cracks in the rice grain surfaces. Even if the moisture adding rate slightly exceeds 0.3% per one hour, cracks occur in the rice grain surfaces, similarly to the case of the dipping of rice grains into water. If the moisture adding rate is considerably high, through cracks occur even in the brown rice covered with pericarp having wax property which prevents penetration of water.

In a conventional rice grain humidifying apparatus as disclosed, for example, in Japanese Patent Application Laid-Open No. 60-21315, a step of adding moisture to rice grains for a relatively short period of time of about 2 to 3 seconds and a tempering step of adding no moisture to the rice grains for a relatively long period of time of about 15 minutes are alternately repeated. In such conventional humidifying apparatus, it has generally been called that the moisture adding rate is 0.3% per one hour. Since, however, the time during which the moisture is actually added to the rice grains is 2 to 3 seconds, the net moisture adding rate during the actual addition of moisture is considerably high, i.e., on the order of 0.033% per one second. Consequently, there may be a possibility that such a risky condition occurs instantaneously that the rice grain surfaces are wetted. In view of this, it is usual to operate the humidifying apparatus at a moisture adding rate slightly lower than the desired or target moisture adding rate. This makes it difficult for the conventional humidifying apparatus to enhance the operating efficiency or performance.

In contradistinction to the above-described rice grain humifying apparatus in which the moisture is intermittently added to rice grains, a polished rice humidifying method as disclosed in U.S. Pat. No. 4,450,181 to Satake, for example, comprises the step of continuously adding moisture little by little at a rate not exceeding 0.3% per one hour. In this continuous moisture adding method, the moisture is added to the rice grains at a low rate of 0.0083% per one second and, therefore, the rice grains are humidified at the maximum limit of the natural moisture absorbing rate of rice grains without wetting the rice grain surfaces, so that no cracks occur in the rice grains. Accordingly, the continuous moisture adding method can be said to be a superior humidifying method. Since it is impossible for such humidifying method to add the moisture to the rice grains at a rate exceeding the natural moisture absorbing rate thereof, however, the time of the moisture adding treatment cannot help being prolonged or lengthened. Alternatively, if the apparatus were increased in size and capacity to enable a great amount of rice grains to be subjected at a time to the humifying treatment, the treating capapcity of the apparatus would be able to be enhanced. In such case, however, the cost of equipment would increase.

OBJECT AND SUMMARY OF THE INVENTION

It is an object of the invention to provide a rice grain humidifying apparatus which can add moisture to rice grains at a rate exceeding the natural moisture absorbing rate of the rice grains, to humidify the same.

According to the invention, there is provided an apparatus for humififying rice grains, comprising:

a humidifying vessel having defined therewithin a substantially closed space and having a supply port for the rice grains and a discharge port therefor;

supply means connected to the supply port for supplying the rice grains to the humidifying vessel through said supply port while substantially preventing gas from escaping from the space within the humidifying vessel through the supply port;

discharge means connected to the discharge port for discharging the rice grains from the humidifying vessel through the discharge port while substantially preventing the gas from escaping from the space within the humidifying vessel through the discharge port;

pressurizing means connected to the humidifying vessel for forcibly delivering the gas into the humidifying vessel, to pressurized the space therewithin; and moisture adding means associated with the humidifying vessel for adding moisture to the rice grains in the pressurized space within the humidifying vessel.

BRIEF DESCRIPTION OF THE DRAWINGS

FIG. 5 is a view similar to FIG. 1, but showing a third embodiment of the invention.

DETAILED DESCRIPTION

Figure 1:
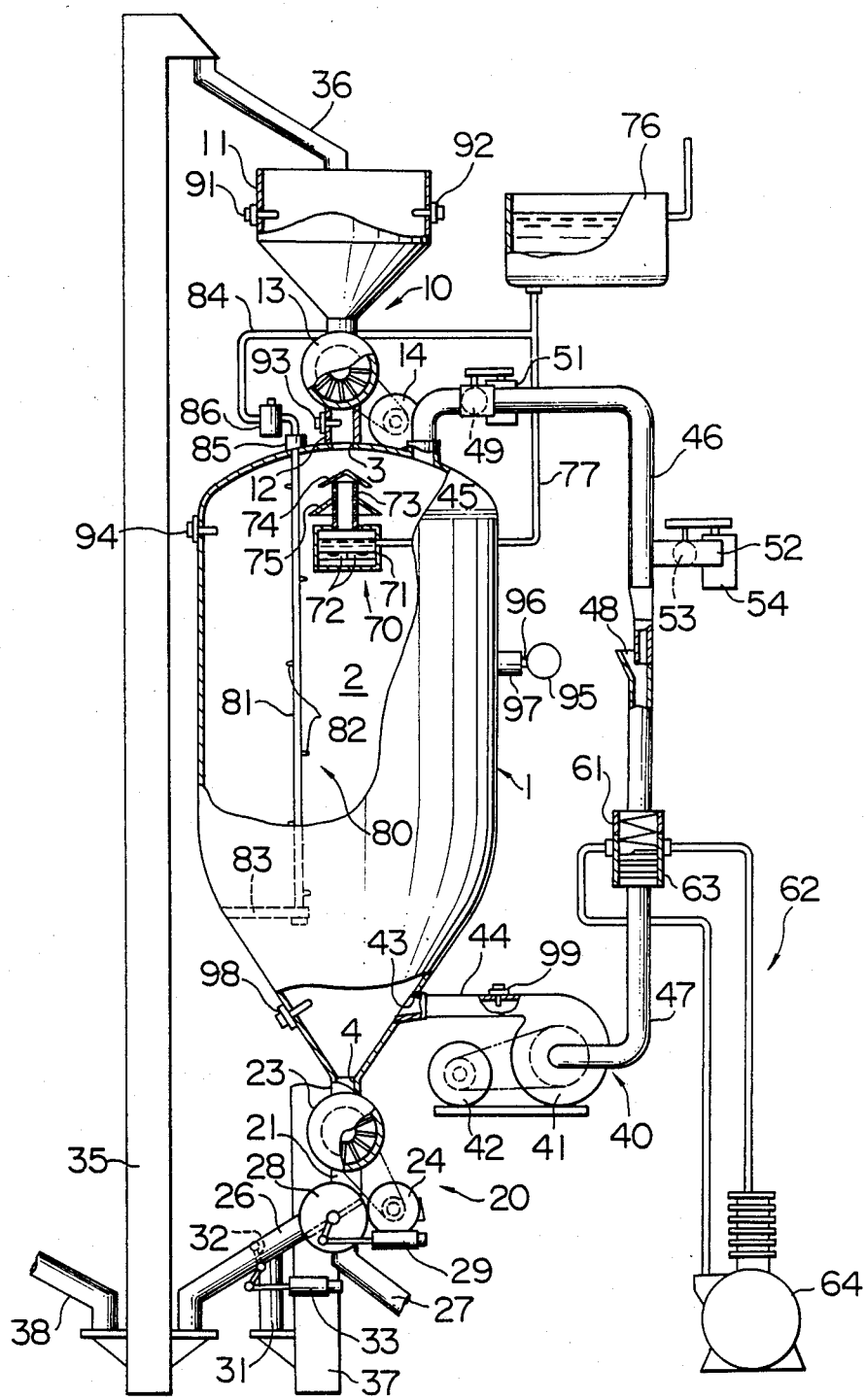
FIG. 1 is a partially broken-way diagrammatic view showing an entire rice grain humidifying apparatus in accordance with the first embodiment of the invention.

Referring to FIG. 1, a rice grain humidifying apparatus in accordance with the first embodiment of the invention comprises a humidifying vessel 1 having defined therewithin a substantially closed space 2. The humidifying vessel 1 is arranged so as to have a longitudinal axis extending substantially vertically, and is comprised of an upper, generally cylindrical portion and a lower, generally concical portion. The humidifying vessel 1 is formed in its top with a supply port 3 for rice grains and in the bottom with a discharge port 4 therefor.

A rice grain supply device, generally designated by the reference numeral 10, comprises a hopper 11 for temporarily storing the rice grains to be treated such as polished rice grains or brown rice grains, and a supply duct 12 having an upstream end thereof connected to the hopper 11 and a downstream end connected to the supply port 3 in the humidifying vessel 1. The supply duct 12 is provided therein with a rotary valve 13 for allowing the rice grains to be supplied from the supply hopper 11 into the humidifying vessel 1 through the supply duct 12 and the supply port 3 while substantially preventing gas such as, for example, air, inert gas or the like from escaping from the space 2 within the humidifying vessel 1 through the supply port 3 and the supply duct 12. The rotary valve 13 has connected thereto an electric motor 14 which is adjustable in rotational speed, so that the rotary valve 13 is rotated by the motor 14.

A rice grain discharge device, generally designated by the reference numeral 20, comprises a discharge duct 21 having an upstream end thereof connected to the discharge port 4. The discharge duct 21 is provided therein with a rotary valve 23 similar to the rotary valve 13, for allowing the rice grains to be discharged out of the space 2 within the humidifying vessel 1 through the discharge port 4 and the discharge duct 21 while substantially preventing the gas from escaping from the space 2 within the humidifying vessel 1 through the discharge port 4 and the discharge duct 21. The rotary valve 23 has connected thereto an electric motor 24 similar to the electric motor 14, so that the rotary valve 23 is rotated by the motor 24.

A pair of branching ducts 26 and 27 are connected to the downstream end of the discharge duct 21. A two-way change-over valve 28 is provided at the connection between the downstream end of the discharge duct 21 and the branching ducts 26 and 27, and is movable between a rice discharging position where the discharge duct 21 is brought into communication with one of the pair of branching ducts 26 and a water draining position where the discharge duct 21 is brought into communication with the other branching duct 27. A pneumatic actuator 29 has a piston rod which is connected to the two-way change-over valve 28 through a link, so that the valve 28 is moved by the actuator 29 between the water draining and rice discharging positions.

A branching duct 31 is connected to an intermediate portion of the one branching duct 26, and a damper 32 is provided at the connection between the branching ducts 31 and 26. A pneumatic actuator 33 is connected to the damper 32 through a link, so that the damper 32 is moved by the actuator 33 between a normal position where the branching duct 31 is closed and the branching duct 26 is opened to allow the rice grains to flow toward the downstream end of the branching duct 26, and a position where the branching duct 31 is opened and the branching duct 26 is closed to allow the rice grains to flow toward the downstream end of the branching duct 31. The branching duct 26 has its downstream end connected to a lower or upstream end of a vertical elevator 35. An upper or downstream end of the elevator 35 is connected to the hopper 11 through a duct 36. Thus, a rice grain recirculation path is formed by the ducts 21 and 26, elevator 35 and duct 36. The branching duct 31 has its downstream end connected to a lower or upstream end of a vertical elevator 37 which has its downstream end connected to a subsequent processing step or station. Rice grains to be treated such as brown rice hulled by a hulling machine or rice polished by a polishing machine are adapted to be supplied to the upstream end of the elevator 35 through a duct 38.

A pressurizing device, generally designated by the reference numeral 40, comprises a high pressure turbo-blower 41 driven by a variable-speed electric motor 42. The turboblower 41 has its discharge port which is connected, through a duct 44, to a gas intake port 43 formed in a lower portion of the humidifying vessel 1 adjacent the discharge port 4. A gas exhaust port 45 is formed in the top of the humidifying vessel 1 adjacent the supply port 3. The gas exhaust port 45 is connected to a suction port of the turboblower 41 through recirculation ducts 46 and 47. The recirculation duct 46 has its downstream end reduced in diameter which, in turn, is inserted into an enlarged upstream end of the recirculation duct 47 to define a fresh-gas intake port 48 between the reduced and enlarged ends. Thus, the recirculation ducts 46 and 47 form a gas recirculation path. The recirculation duct 46 is provided therein with a valve 49 which is actuated by an electric motor 51 to open and close the recirculation duct 46. An exhaust pipe 52 is connected to an intermediate portion of the recirculation duct 46. The exhaust pipe 52 is provided therein with a valve 53 which is actuated by an electric motor 54 between a position where the pipe 52 is closed and a position where the pipe 52 is opened.

A heater 61 for heating the gas flowing through the recirculation duct 47 comprises and electric-resistance heating elements wound around the recirculation duct 47. A cooler 62 for cooling the gas flowing through the recirculation duct 47 comprises an evaporator 63 disposed around the recirculation duct 47, and a compressor 64 for compressing refrigerant from the evaporator 63 and delivering the compressed refrigerant thereto.

A moisture adding device, generally designated by the reference numeral 70, comprises a water container 71 located at an upper portion of the space 2 within the humidifying vessel 1. A plurality of supersonic-wave vibrating elements 72 are arranged at a bottom of the water container 71. A perforated tubular member 73 has its lower open end in communication with the top of the water container 71. An upper open end of the perforated tubular member 73 is closed by a conical diffusion member 74. A frusto-conical diffusion member 75 is attached around a portion of the perforated tubular member 73 between its upper and lower ends. A water tank 76 is connected to the water container 71 through a pipe 77 which extends through the peripheral wall of the humidifying vessel 1, to supplement water to the water container 71.

A cleaning device, generally designated by the reference numeral 80, comprises a vertically extending, distribution pipe 81 which is rotatably arranged within the humidifying vessel 1. A plurality of nozzles 82 are connected to the distribution pipe 81 so as to be directed tangentially with respect to the peripheral surface of the distribution pipe 81. The distribution pipe 81 has a lower end thereof rotatably supported by a bracket 83 and an upper end sealingly connected to a downstream end of a pipe 84 by a coupling 85 for rotation relative thereto. An upstream end of the pipe 84 is connected to the pipe 77. A compression pipe 86 is provided in the pipe 84 to deliver the pressurized water to the distribution pipe 81.

A moisture sensor 91 mounted to the peripheral wall of the hopper 11 detects moisture of the rice grains within the hopper 11 to generate a signal representative thereof. A temperature sensor 92 mounted to the peripheral wall of the hopper 11 detects the temperature of the rice grains therewithin to generate a signal representative thereof. A rice grain sensor 93 mounted to a portion of the supply duct 12 between the rotary valve 13 and the supply port 3 detects whether or not the rice grains are supplied by the rotary valve 13 toward the supply port 3, to generate a signal when the rice grains are supplied toward the supply port 3. A level sensor 94 mounted to an upper portion of the peripheral wall of the humidifying vessel 1 detects whether or not the humidifying vessel 1 is filled with the rice grains up to a predetermined level, to generate a signal when the vessel 1 is filled up to the predetermined level. A pressure gage 95 is in communication with the space 2 within the humidifying vessel 1 through a pipe 96, to indicate the pressure of the space 2. In addition, a pressure sensor 97 is provided in the pipe 96 for detecting the pressure of the space 2 to generate a signal representative thereof. A moisture sensor 98 mounted to a lower portion of the peripheral wall of the humidifying vessel 1 detects moisture of the rice grains humidified within the humidifying vessel 1, to generate a signal representative thereof. A temperature sensor 99 is mounted to the duct 44 extending between the discharge port of the turboblower 41 and the gas intake port 43, for detecting the temperature of the gas passing through the duct 44, to generate a signal representative thereof.

Figure 2:
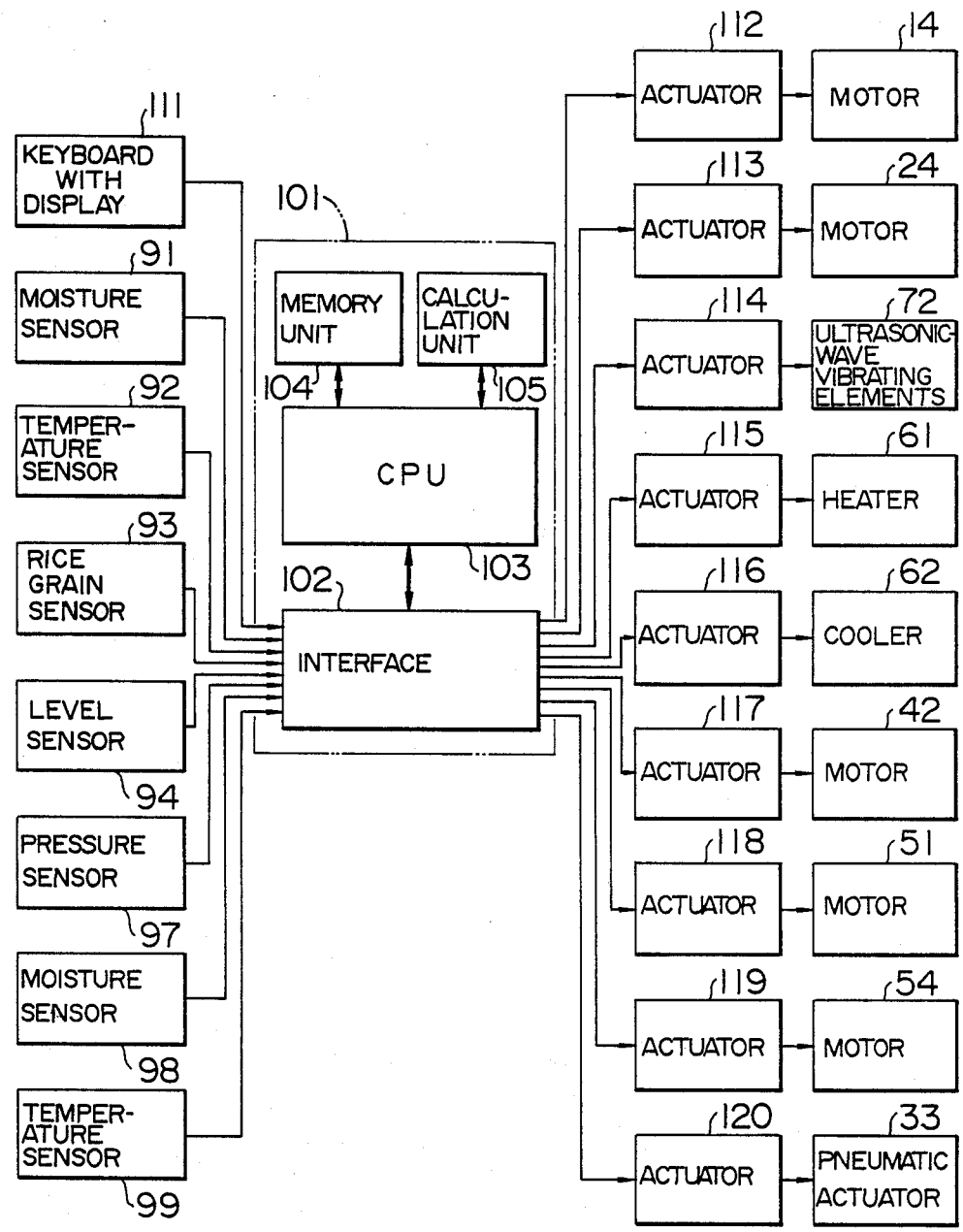
FIG. 2 is a block diagram showing a control system incorporated in the apparatus illustrated in FIG. 1.

FIG. 2 shows a control system 100 for controlling the operation of the rice grain humidifying apparatus illustrated in FIG. 1. The control system 100 comprises a microcomputer 101 which includes an interface 102, a central processing unit 103 (hereinafter referred to as "CPU") 103 connected to the interface 102, and memory unit 104 and a calculation unit 105 connected to the CPU 103. Connected to an input side of the interface 102 are keyboard 111 with a display, and the various sensors 91, 92, 93, 94, 97, 98 and 99 described with reference to FIG. 1. An output side of the interface 102 is connected, through respective actuators 112 to 120, to the electric motors 14 and 24, supersonic-wave vibrating elements 72, heater 61, cooler 62, variable-speed motor 42, motors 51 and 54, and pneumatic actuator 33.

Figure 3:
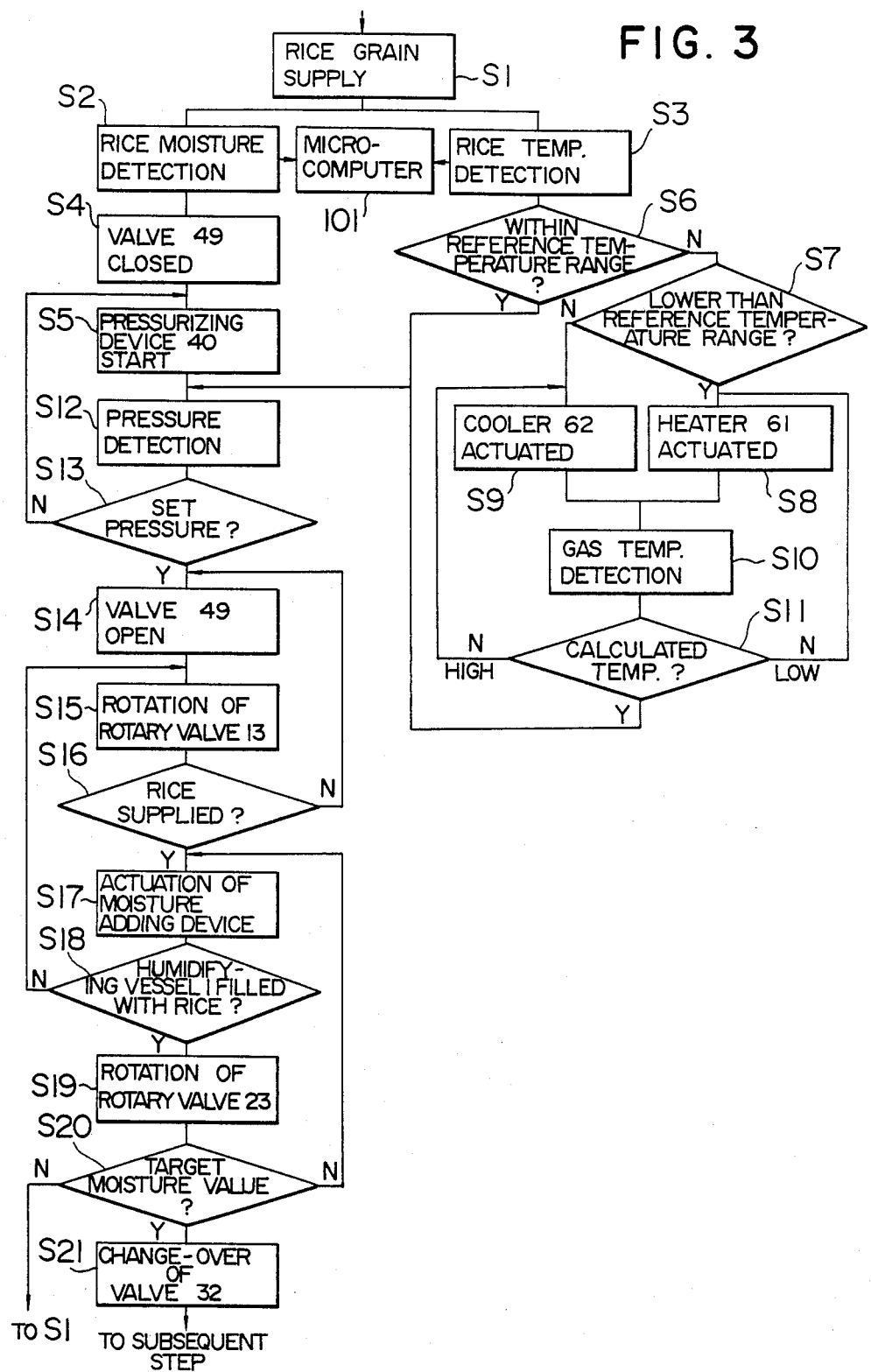
FIG. 3 is a flow chart showing the program of the control system illustrated in FIG. 2.

The operation of the rice grain humidifying apparatus described in connection with FIGS. 1 and 2 will be described with reference to FIG. 3.

Prior to the operation of the rice grain humidifying apparatus, an operator operates the keyboard 111 to input the following set values to the microcomputer 101:

(1) rotational speed (rpm) of rotary valve 23, i.e., rotational speed (rpm) of electric motor 24, which determines flow rate (Kg/s) of rice grains flowing within humidifying vessel 2;

(2) pressure ($Kg/cm^2$; gage pressure) within humidifying vessel 1;

(3) reference temperature range for judging necessity of heating and cooling of rice grains;

(4) maximum limit of humidifying rate per unit time (%/hr); and (5) desired or target moisture content (%) of rice grains.

After the above set values are inputted, the elevator 35 is operated to supply the rice grains delivered through the duct 38, to the hopper 11 (step S1). Moisture and temperature of the rice grains within the hopper 11 are detected respectively by the moisture sensor 91 and temperature sensor 92 (steps S2 and S3). These detected values are inputted into the CPU 103 through the interface 102 of the microcomputer 101, and are stored in the memory unit 104. Based on the above-noted set values stored in the memory unit 104 and the detected value from the sensor 91, the calculation unit 105 calculates a time duration during which the moisture is added to the rice grains, and an amount of water added to the rice grains. The calculated value is inputted into the CPU 103 to determine the number of supersonic-wave vibrating elements 72 to be actuated. The determined number is stored in the memory unit 104 and, simultaneously, the CPU 103 outputs respective signals to the actuators 117 and 118 through the interface 102. The actuator 118 actuates the motor 51 to move the valve 49 to the closed position, to close the recirculation duct 46 (step S4). The actuator 117 starts the operation of the variable speed motor 42 for the high pressure turboblower 41 (step S5). Furthermore, the CPU 103 compares the signal from the temperature sensor 92 representative of the temperature of the rice grains within the hopper 11, with the reference temperature range stored in the memory unit 104. When the temperature of the rice grains within the hopper 11 is within the reference temperature range, the CPU 103 issues no signal, and the operation of the heater 61 and the cooler 62 is unnecessary (step S6). The temperature of the rice grains within the hopper 11 is out of the reference temperature, it is judged whether the temperature of the rice grains within the hopper 11 is higher or lower than the reference temperature range (step S7). When the rice grain temperature is lower than the reference temperature range, the CPU 103 sends a signal to the actuator 115 to actuate the heater 61, to thereby heat the gas flowing through the recirculation duct 47 (step S8). When the rice grain temperature is higher than the reference temperature range, the CPU 103 sends a signal to the actuator 116 to actuate the cooler 62 (step S9). The temperature sensor 99 detects the temperature of the gas within the duct 44 which varies depending upon the actuation of the heater 61 or cooler 62, to send a signal representative of the detected temperature to the CPU 103 (step S10). Based on the signal from the temperature sensor 92 representative of the temperature of the rice grains within the hopper 11, the calculation unit 105 calculates a temperature of the gas which is required to bring the rice grains into the reference temperature range. When the temperature sensor 99 detects that the temperature of the gas flowing through the duct 44 is higher or lower than the calculated temperature, the CPU 103 sends a signal to the actuator 115 or 116, to strengthen or weaken the operation of the cooler 62 or heater 61, or to control the cooler or heater in an ON-oFF manner (step S11).

The purpose of regulation of the rice grain temperature into the reference temperature range is to prevent the moisture from shifting or moving within each rice grain when the rice grains subjected to the humidifying treatment are discharged out of the humidifying vessel 1 and are exposed to the surrounding air.

Subsequently, the pressure within the humidifying vessel 1 is detected by the pressure sensor 97 (step S12). A signal representative of the detected pressure is sent to the CPU 103 through the interface 102, where the signal is compared with the set pressure value (0.2 to 0.3 $Kg/cm^2$, for example) stored in the memory unit 104 (step S13). When the pressure within the humidifying vessel 1 reaches the set pressure, the CPU 103 sends respective signals to the actuators 112 and 118. The actuator 118 actuates the motor 51 to move the valuve 49 to the open position, to thereby open the recirculation duct 46 (step S14). This allows the gas within the humidifying vessel 1 to flow into the recirculation duct 46, so that the gas is recirculated through the gas recirculation path formed by the ducts 46 and 47. The actuator 112 starts the operation of the electric motor 14 to rotate the rotary valve 13, to thereby supply the rice grains from the hopper 11 to the humidifying vessel 1 (step S15).

When the rice grain sensor 93 detects the flow of rice grains supplied to the humidifying vessel 1 (step S16), the detecting signal from the rice grain sensor 93 is sent to the CPU 103 and is stored in the memory unit 104, and a signal representative of the number of supersonic-wave vibrating elements 72 to be actuated determined by the CPU 103 is sent to the actuator 114. The actuator 114 actuates one or more supersonic-wave vibrating element or elements 72 to generate mist of fine particles. The mist flows from the water container 71 into the perforated tubular member 73 and flows out through a plurality of apertures therein (step S17). The flowing-out mist is diffused by the diffusion members 74 and 75, so that moisture is added to the surfaces of the rice grains flowing down. When the level sensor 94 detects that the humidifying vessel 1 is filled with the supplied rice grains to the predetermined level (step S18), the signal from the level sensor 94 is sent to the CPU 103 which, in turn, sends a signal to the actuator 113 to start the operation of the motor 24. This causes the rotary valve 23 to be rotated at the set rotational speed, i.e., at the same rotational speed as the rotary valve 13, to discharge the rice grains from the humidifying vessel 1 (step S19). The rotary valve 13 continues to rotate, to continuously supply the rice grains to be treated, into the humidifying vessel 1. The moisture sensor 98 detects the moisture of the rice grains flowing downwardly under gravity within the humidifying vessel 1 (step S20). A signal from the moisture sensor 98 is sent to the CPU 103. If the signal from the moisture sensor 98 indicates that the moisture of the rice grains reaches the target moisture value set in the memory unit 104, the CPU 103 sends a signal to the actuator 120 to actuate the pneumatic actuator 33. The actuator 33 causes the two-way change-over valve 28 to close the branching duct 26 and to open the branching duct 31 (step S21). The rice grains humidified up to the target moisture value are delivered to the subsequent processing step by the elevator 37. If the moisture of the rice grains detected by the moisture sensor 98 does not reach the target moisture value, the CPU 103 sends any no signal to the actuator 120. The two-way change-over valve 32 is normally in position where the branching duct 26 is opened and the branching duct 31 is closed and, therefore, the insufficiently humidified rice grains are returned to the hopper 11 through the elevator 35 and the duct 36 which form the rice grain recirculation path. During delivery of the rice grains through the rice grain recirculation path, the gas penetrated into the rice grains is naturally released from the interior of each rice grain. The above-noted steps S2 to S21 are repeated.

During the period that the rice grains have added thereto the moisture and reach the discharge port 4, the moisture added to the rice grain surfaces is subjected to the pressurization higher than the atmospheric pressure by the operation of the pressurizing device 40. Consequently, the moisture is penetrated into the interior of each rice grain at a rate higher than the natural moisture absorption rate. Thus, the moisture in the surface layer of each rice grain and the moisture in the interior thereof are equalized with each other for a short period of time, making it possible to increase the humidifying rate without occurrence of cracks in the rice grains. That is to say, since the rice grains are humidified within the humidifying vessel 1 high in pressure, even if the rice grains are humidified at a rate higher than the value equal to or less than 3% per hour which is said to be adequate in the previously discussed conventional humidifying apparatus, the moisture in the rice grain surface layer is penetrated into the rice grain interior under the pressurizing action of gas, for a short period of time unitl the surface layer is expanded by the moisture exceeding the amount which can be absorbed by the surface layer. Thus, the moisture in the rice grains surface layer and the moisture in the rice grain interior are equalized with each other to prevent a strain from being developed due to a moisture difference, to thereby make it possible to enhance the humidifying rate without occurrence of cracks in the rice grains.

When the moisture value of the humidified rice grains does not reach the target moisture value, the rice grains are again returned to the humidifying vessel 1 and are again humidified therewithin. When the value detected by the moisture sensor 98 and the set target moisture value stored in the memory unit 104 are compared with each other, and the moisture difference therebetween is less than the maximum limit of humidifying rate per unit time stored in the memory unit 104, the CPU 103 sends a signal to the actuator 114 to reduce the number of supersonic-wave vibrating elements 72 actuated or the oscillation frequency of the actuated vibrating element or elements 72.

When dirts and dusts contained in the pressurizing gas passing between the rice grains increase in amount with the lapse of operating time of the humidifying apparatus, or when the temperature of the pressurizing gas rises to a level higher than the temperature calculated at the step S11, signals are sent at suitable time intervals from the CPU 103 to the actuator 119 through the interface 102, to actuate the motor 54. The actuation of the motor 54 causes the valve 53 to be opened to allow the contaminated gas to be discharged through the duct 52, and to allow fresh gas to be introduced into the duct 47 through the fresh-gas intake port 48. Alternatively, the valve 53 may be normally closed slightly to always supplement the fresh gas little by little, while always discharging the recirculating gas slightly. As the contaminated gas is discharged through the duct 52, the pressure within the humidifying vessel 1 decreases to a level lower than the set pressure value. When the pressure sensor 97 detects that the pressure within the humidifying vessel 1 decreases to a level lower than the set pressure value, the CPU 103 sends a signal to the actuator 117 to increase the rotational speed of the variable-speed motor 42 which actuates the high pressure turboblower 41. In this manner, the pressure within the humidifying vessel 1 is maintained at the predetermined pressure.

After the humidifying treatment of some number of lots has been effected, or at the time an exchange is effected to a humidifying treatment of polished rice subsequent to a humidifying treatment of brown rice, it is necessary to clean the inner wall surface of the humidifying vessel 1 so as to remove deposits therefrom. For this purpose, the pneumatic actuator 29 is operated to actuate the two-way change-over valve 28, to bring the discharge duct 21 into communication with the water draining duct 27. Subsequently, the cleaning device 80 is operated. Specifically, the compression pump 86 is operated and the electric motor 24 is actuated to drive the rotary valve 23. The pressurized water is forcibly delivered to the distribution pipe 81, and is injected through the injection nozzles 82 toward the inner wall surface of the humidifying vessel 1. The water injection from the injection nozzles 82 causes the distribution pipe 81 to be rotated around its own axis. The water which has cleaned the inner wall surface of the humidifying vessel 1 flows out of the water draining duct 27. After cleaning, the compression pump 86 and the electric motor 24 are stopped in operation. Subsequently, the variable-speed motor 42 for driving the high pressure turboblower 41 and the heater 61 are actuated to dry the interior of the humidifying vessel 1, in preparation for a subsequent humidifying treatment.

If the humidifying rate does not reach its maximum limit in spite of the fact that an amount of mist generated by the moisture adding device 70 is maximum, the initially set rotational speed of the electric motor 24 may be controlled to adequately adjust the rotational speed of the rotary valve 23 so as to reduce the rice grain flow speed within the humidifying vessel 1, to thereby adjust the humidifying rate.

A compressor may be employed in combination with the high pressure turboblower 41, as the pressurizing device 40. Additionally, the above-described various controls may be effected manually.

Figure 4:
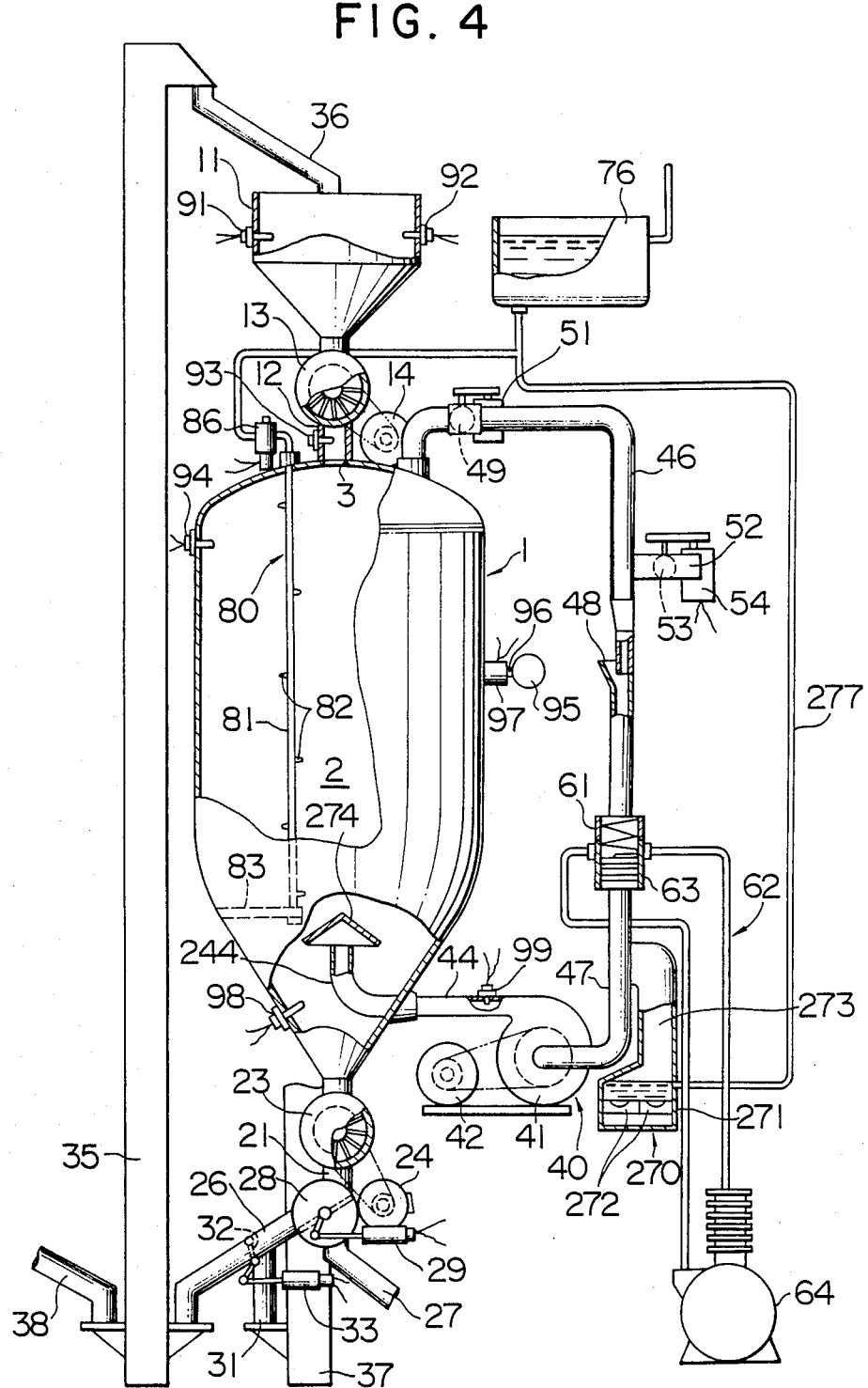
FIG. 4 is a view similar to FIG. 1, but showing a second embodiment of the invention.

FIG. 4 shows a rice grain humidifying apparatus in accordance with a second embodiment of the invention. In FIG. 4, like reference numerals are used to designate parts or components corresponding to those illustrated in FIG. 1, and the description of such corresponding parts or components will be omitted to avoid duplication. The rice grain humidifying apparatus shown in FIG. 4 comprises a moisture adding device generally designated by the reference numeral 270. The moisture adding device 270 has a water container 271 arranged exteriorly of the humidifying vessel 1. The water container 271 is connected to the water tank 76 by a pipe 277. A plurality of supersonic-wave vibrating elements 272 are arranged at the bottom of the water container 271. A duct 273 has open one end thereof in communication with the top of the water container 271. The other end of the duct 273 is connected to the recirculation duct 47 at a location between the evaporator 63 of the cooler 62 and the high pressure turboblower 41. One end of a curved duct 244 arranged within the humidifying vessel 1 is connected to the duct 44 at the gas intake port 43 shown in FIG. 1. The other open end of the curved duct 244, which is directed upwardly, is positioned in facing, but spaced relation to an inner surface of a conical diffusion member 274 disposed at a lower portion of the space 2 within the humidifying vessel 1. The remaining structure of the second embodiment illustrated in FIG. 4 is identical with that of the first embodiment illustrated in FIG. 1.

In operation of the second embodiment shown in FIG. 4, mist generated by the supersonic-wave vibrating elements 272 of the moisture adding device 270 flows into the recirculation duct 47 through the duct 273, and is mixed with the gas flowing through the recirculation duct 47, to form humid gas. The humid gas flows into the space 2 within the humidifying vessel 1 through a gap between the other open end of the duct 244 and the diffusion member 274. The humid gas flows toward the top of the humidifying vessel 1 while humidifying the rice grains flowing downwardly within the humidifying vessel 1. The gas reaching the top of the humidifying vessel 1 flows into the recirculation duct 46 through the exhaust port 45 shown in FIG. 1, and is again wetted by the mist from the moisture adding device 270 when the gas passes through the recirculation duct 47. In this manner, the second embodiment is arranged such that the humid gas is passed between the rice grains to humidify the same. Operations other than those described above are identical with those of the first embodiment described presviously, and will not be described.

FIG. 5 shows a rice grain humidifying apparatus in accordance with a third embodiment of the invention. In FIG. 5, like reference numerals are used to designate like or similar parts or components illustrated in FIG. 1, and the description of such like or similar parts or components will be omitted. The rice grain humidifying apparatus illustrated in FIG. 5 comprises a screw conveyor 390 arranged within the humidifying vessel 1. The screw conveyor 390 includes a barrel 391 having a vertical axis coincident with the longitudinal axis of the humidifying vessel 1, a shaft 392 disposed within the barrel 391 in concentric relation thereto, and a screw 393 mounted around the shaft 392. An upper open end of the barrel 391 is located substantially at the same elevation as the level sensor 94. A speed-reduction motor 394 is positioned adjacent the bottom of the space 2 within the humidifying vessel 1, and the motor 394 has an output shaft connected to the lower end of the shaft 392. A moisture adding device, generally designated by the reference numeral 370, comprises a conical diffusion member 371 arranged at the top of the space 2 within the humidifying vessel 1. The diffusion member 371 is disposed in facing, but upwardly spaced relation to the upper open end of the barrel 391. An injection nozzle 372 is positioned at a center of the diffusion member 371. The injection nozzle 372 is connected to the water tank 76 through a pipe 377. The pipe 377 is provided therein with a electromagnetic pump 373 capable of adjusting flow rate therethrough. The remaining structure of the third embodiment illustrated in FIG. 5 is substantially identical with that of the first embodiment illustrated in FIG. 1.

In operation of the third embodiment shown in FIG. 5, the rice grains are filled within the humidifying vessel 1 up to a predetermined level and are temporarily stored therein. Subsequently, the space 2 within the humidifying vessel 1 is regulated so that the pressure and temperature of the space 2 reach predetermined respective values. The speed-reduction motor 394 is started in operation to cause the screw conveyor 390 to deliver the rice grains from a position adjacent the discharge port 4 (FIG. 1) to a position adjacent the supply port 3, to recirculate the rice grains within the humidifying vessel 1. Mist is jetted from the injection nozzle 372 of the moisture adding device 370, against the rice grains discharged from the upper open end of the barrel 391. The rice grains are subjected to the pressurizing action within the humidifying vessel 1 in the course of flowing toward the surface layer of the stored rice grains, so that the moisture added to the rice grain surface is penetrated under pressure into the rice grain interior. If the detected value of the moisture sensor 98 reaches the target moisture value at the time the surface layer and interior of each rice grain are humidified up to substantially the same moisture value, the electric motor 24 and the pneumatic actuator 33 are actuated. This causes the humidified rice grains to be discharged from the humidifying vessel 1 into the duct 37 and to be delivered to the subsequent processing step. If the detected value of the moisture sensor 98 does not reach the target moisture value, the conveyor 390 continues to recirculate the rice grains and the moisture is added to the recirculated rice grains. The third embodiment is characterized in that an efficient operation can be effected in case where a considerable difference is present between the moisture value of the rice grains to be treated and the target moisture value, and twice or more humidifications are required even if the operation is effected within the safe range of humidification rate and at the maximum limit of the humidification rate per unit time.

When it is required to continuously repeat a plurality of recirculated humidifying actions in the third embodiment illustrated in FIG. 5, the variable-speed motor 42 of the pressurizing device 40 is temporarily stopped in operation, and the motor 54 is actuated to open the valve 53, so as to permit the gas to escape from the recirculation duct 46 through the duct 52. This causes the pressure within the humidifying vessel 1 to be decreased to the atmospheric pressure, to permit the gas from released from each rice grain interior. Subsequently, the valve 53 is closed, and the variable-speed motor 42 is again started in operation to increase the pressure within the humidifying vessel 1 to the predetermined pressure value. Then, the moisture is added to the rice grains until the moisture of the rice grains reaches the target moisture value.

As described above, the rice grain humidifying apparatus in accordance with the present invention is arranged such that rice grains are humidified in a substantially closed space within a humidifying vessel and, simultaneously, the added moisture is penetrated into the rice grain interior under the pressurizing action. With such arrangement, the moisture is shifted from the rice grain surface toward the rice grain interior at a high speed. Accordingly, it is possible to add the moisture to the rice grains at a rate higher than the natural moisture absorption rate, to humidify the rice grains. This makes it possible to considerably reduce the humidification treating time without occurence of cracks in the rice grains. Moreover, it is possible to reduce the size of the apparatus, making it possible to reduce the cost of equipment of the appartus.

What is claimed is:

1. An apparatus for humidifying rice grains, comprising:

a humidifying vessel having defined therewithin a substantially closed space for containing rice grains and gas in pressurized condition therewithin and having a supply port for the rice grains and a discharge port therefor;

supply means connected to said supply port for supplying the rice grains to said humidifying vessel through said supply port while substantially preventing such gas from escaping from said closed space within the humidifying vessel through said supply port;

discharge means connected to the discharge port for discharging the rice grains from said humidifying vessel through said discharge port while substantially preventing the gas from escaping from said space within said humidifying vessel through said discharge port;

pressurizing means connected to said humidifying vessel for forcibly delivering the gas into and passing the gas through said humidifying vessel, to pressurize said space therewithin; and moisture adding means, and control means for operating the supply means, discharge means, pressurizing means and moisture adding means, associated with said humidifying vessel and arranged for increasing the moisture-content in the rice grains in said pressurized space within said humidifying vessel, while avoiding substantial occurrence of cracks in the rice grains, at a rate higher than 0.3% per one hour and exceeding the natural moisture absorbing rate of the rice grains.

2. An apparatus as defined in claim 1, including: recirculation path means through which the gas delivered into said humidifying vessel and passed therethrough by said pressurizing means is returned thereto, the returned gas being forcibly delivered into said humidifying vessel by said pressurizing means.

3. An apparatus as defined in claim 2, wherein said recirculation path means comprises at least one duct, a fresh-gas intake port provided in said duct, and a valve located upstream of said fresh-gas intake port with reference to the gas flow passing through said duct, said valve being movable between an open position where the gas is permitted to escape from said duct and a closed position where the gas is prevented from escaping from said duct.

4. An apparatus as defined in claim 3, wherein said supply port and said discharge port are provided respectively in a top and a bottom of said humidifying vessel, said humidifying vessel having a gas intake port provided therein adjacent said discharge port and a gas exhaust port provided in said humidifying vessel adjacent said supply port, the gas pressurized by said pressurizing means being returned thereto through said gas intake port, said humidifying vessel, said gas exhaust port and said recirculation path means.

5. An apparatus as defined in claim 1, wherein said moisture adding means applies mist to the rice grains within said humidifying vessel to humidify the rice grains.

6. An apparatus as defined in claim 5, wherein said moisture adding means comprises a water container arranged within said humidifying vessel, a plurality of sueprsonic-wave vibrating elements disposed at a bottom of said water container for generating the mist, a perforated tubular member having opposed open ends, one said open end thereof being in communication with said water container, and a conical diffusion member provided adjacent said supply port for closing the other said end of said perforated tubular member.

7. An apparatus as defined in claim 1, wherein said moisture adding means mixes mist with the gas delivered into said humidifying vessel by said pressurizing means.

8. An apparatus as defined in claim 7, including:
recirculation path means through which the gas delivered into said humidifying vessel and passed therethrough by said pressurizing means is returned thereto, the returned gas being forcibly delivered into said humidifying vessel by said pressurizing means.

9. An apparatus as defined in claim 8, wherein said moisture adding means comrpises a water container arranged exteriorly of said humidifying vessel, a plurality of supersonic-wave vibrating elements disposed at a bottom of said water container for generating the mist, and a duct having one end thereof in communication with said water container and the other end connected to said recirculation path means for introducing the mist generated by said supersonic-wave vibrating elements, into said recirculation path means.

10. An apparatus as defined in claim 9, wherein said recirculation path means comprises at least one duct, a fresh-gas intake port provided in said duct, and a valve located upstream of said fresh-gas intake port with reference to the gas flow passing through said duct, said valve being movable between an open position where the gas is permitted to escape from said duct and a closed position where the gas is prevented from escaping from said duct.

11. An apparatus as defined in claim 10, wherein said supply port and said discharge port are provided respectively in a top and a bottom of said humidifying vessel, said humidifying vessel having a gas intake port provided therein adjacent said discharge port and a gas exhaust port provided in said humidifying vessel adjacent said supply port, the gas pressurized by said pressurizing means being returned thereto through said gas intake port, said humidifying vessel, said gas exhaust port and said recirculation path means.

12. An apparatus as defined in claim 11, including:
a duct arranged within said humidifying vessel and having one end connected to said gas intake port and the other end opening toward said supply port in a lower portion of said space within said humidifying vessel; and
a conical diffusion member positioned in facing relation to the other open end of said duct.

13. An apparatus as defined in claim 1, including:
means for heating the gas forcibly delivered into said humidifying vessel by said pressurizing means; and
means for cooling the gas forcibly delivered into said humidifying vessel by aid pressurizing means.

14. An apparatus as defined in claim 1, including:
recirculation path means for returning the rice grains discharged through said discharge port, to said supply port.

15. An apparatus as defined in claim 1, including:
recirculating means arranged within said humidifying vessel for delivering the rice grains from a position adjacent said discharge port to a position adjacent said supply port for recirculating the rice grains within said humidifying vessel.

16. An apparatus as defined in claim 15, wherein said moisture adding means injects mist against the rice grains delivered to said position adjacent said supply port by said recirculating means.

17. An apparatus as defined in claim 16, wherein said recirculating means comprises a screw conveyor including a barrel, a screw disposed within said barrel, and a motor drivingly connected to said screw for rotating the same.

18. An apparatus as defined in claim 1, including:
cleaning means for injecting cleaning liquid against an inner wall surface of said humidifying vessel to remove deposits therefrom.

19. An apparatus as defined in claim 18, wherein said cleaning means comprises a pipe having a substantially vertical axis and rotatably supported within said humidifying vessel, a plurality of nozzles connected to said pipe so as to be directed substantially tangentially with respect to a peripheral surface of said pipe, and a pump connected to said pipe for forcibly delivering the cleaning liquid into said pipe.

* * * * *